(12) United States Patent
Miyake

(10) Patent No.: US 7,273,081 B2
(45) Date of Patent: Sep. 25, 2007

(54) HEAVY LOAD PNEUMATIC TIRE WITH TREAD HAVING CLOSED SIPEINGS IN RIBS AND PROJECTING STRIPE IN MAIN GROOVE

(75) Inventor: Akinori Miyake, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 199 days.

(21) Appl. No.: 11/104,752

(22) Filed: Apr. 13, 2005

(65) Prior Publication Data
US 2005/0230020 A1 Oct. 20, 2005

(30) Foreign Application Priority Data
Apr. 15, 2004 (JP) .............................. 2004-120395
Oct. 1, 2004 (JP) .............................. 2004-290171

(51) Int. Cl.
*B60C 11/04* (2006.01)
*B60C 11/12* (2006.01)
*B60C 11/13* (2006.01)

(52) U.S. Cl. ........................... 152/209.17; 152/209.19; 152/901; 152/DIG. 1; 152/DIG. 3

(58) Field of Classification Search .......... 152/209.17, 152/209.18, 209.19, 900, 901, DIG. 1, DIG. 3
See application file for complete search history.

(56) References Cited

U.S. PATENT DOCUMENTS

D116,310 S  *  8/1939  Murphy .................. 152/209.19
2,261,025 A  * 10/1941  Havens .................. 152/DIG. 3
4,484,610 A  * 11/1984  Wallet et al. .......... 152/209.18
4,884,606 A  * 12/1989  Matsuda et al. ....... 152/DIG. 3
5,417,269 A  *  5/1995  Kinoshita et al. ...... 152/209.19
5,549,146 A  *  8/1996  Trabandt et al. ....... 152/209.19
5,833,781 A  * 11/1998  Fukumoto et al. ..... 152/209.19
6,006,804 A  * 12/1999  Yokota .................. 152/209.19
6,796,349 B2 *  9/2004  Tozawa et al. ......... 152/209.19

FOREIGN PATENT DOCUMENTS

| JP | 6-239107 | 8/1994 |
| JP | 9-066708 | 3/1997 |
| JP | 2001-163014 | 6/2001 |
| JP | 2004-001608 | 1/2004 |

OTHER PUBLICATIONS

Abstract for Japan 6-239107, Dec. 23, 2006.*
Machine translation for Japan 6-239107, Dec. 26, 2006.*

* cited by examiner

*Primary Examiner*—Steven D. Maki
(74) *Attorney, Agent, or Firm*—Knobbe Martens Olson & Bear, LLP

(57) ABSTRACT

The present invention provides a heavy load pneumatic tire capable of effectively preventing a river wear from generating while preventing a crack or a stone-biting from generating in a sipeing end. In a heavy load pneumatic tire in which a tread portion has a rib pattern formed with ribs divided by main grooves which are continuous in a circumferential direction of the tire, at least one of the main grooves that is located on the outermost side in a widthwise direction of the tire is provided at its groove bottom with a projecting stripe which is continuous in the circumferential direction of the tire, and the ribs adjacent to an inner side of the main groove are provided with closed sipeings arranged at substantially constant distances from each other.

13 Claims, 6 Drawing Sheets

[FIG.1]
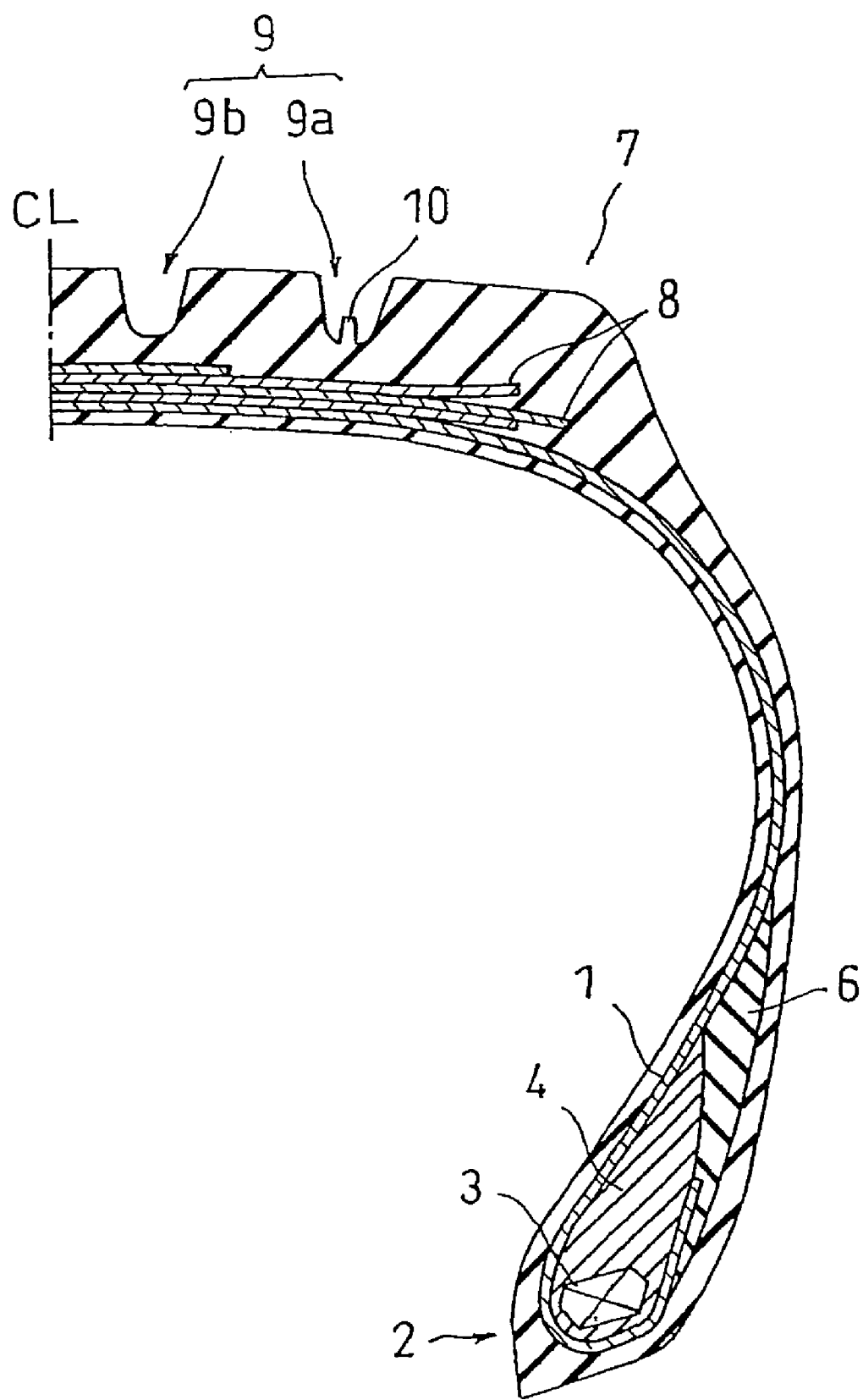

[FIG.2]
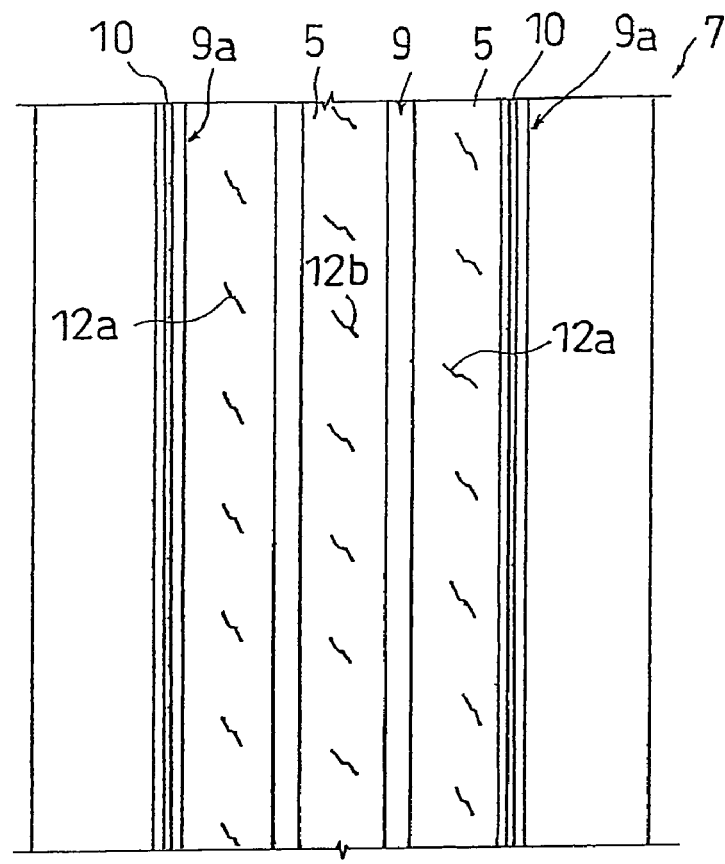
[FIG.3]
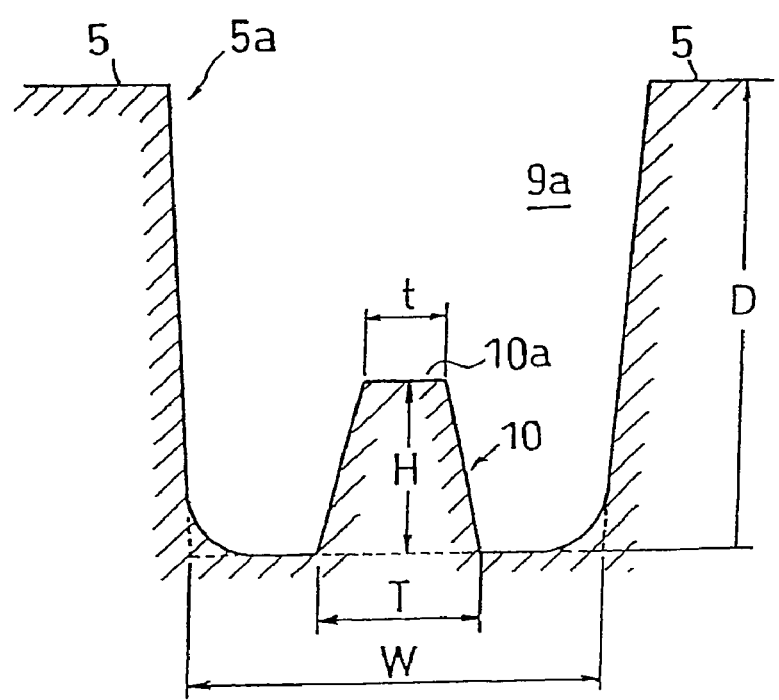

[FIG.4]
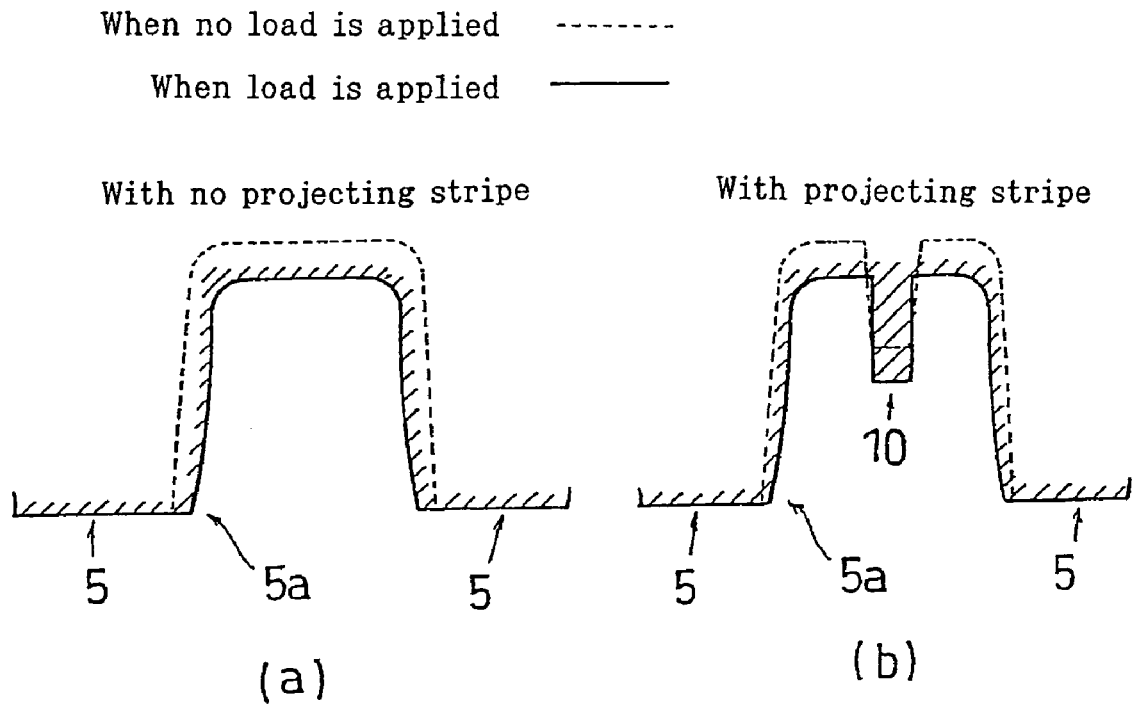
[FIG.5]
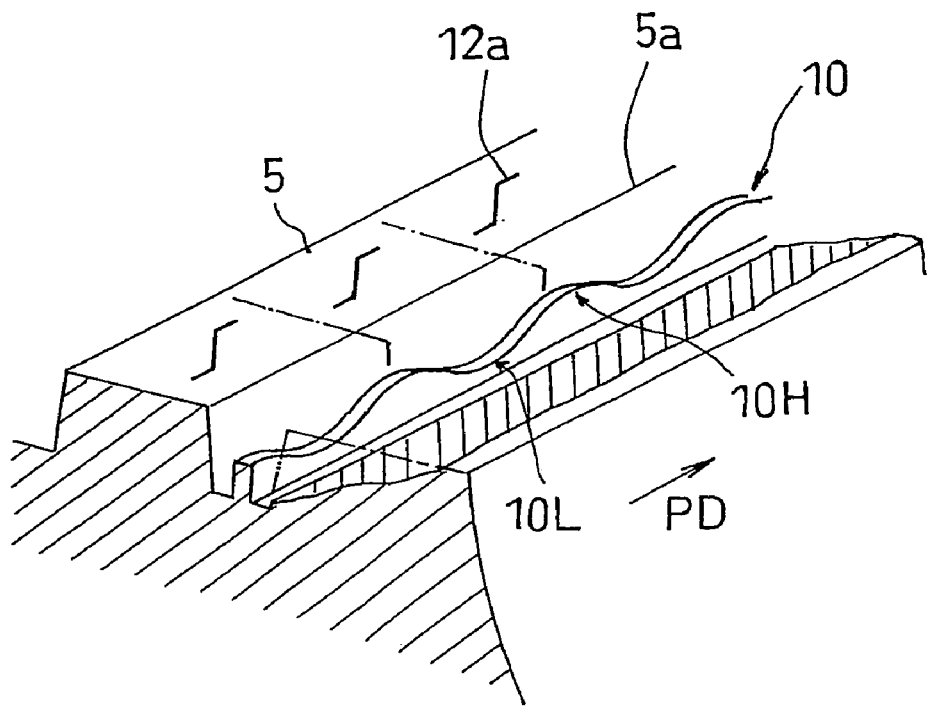

[FIG.6]
(a)
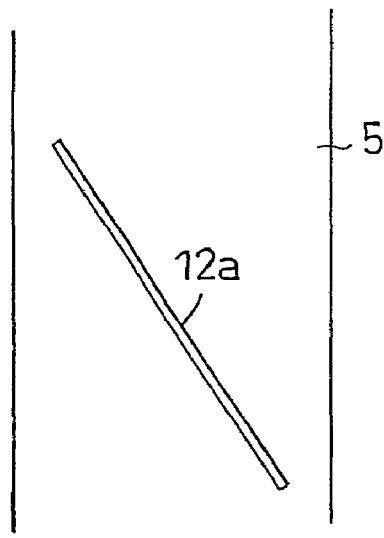
(b)
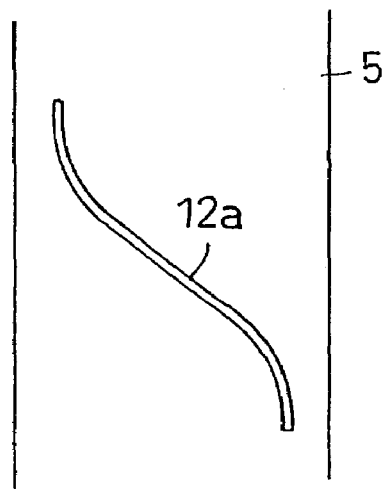
(c)
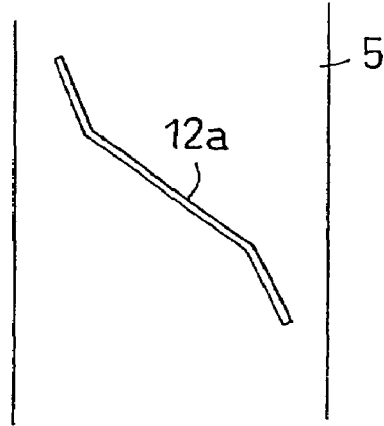

[FIG. 7]
(a)
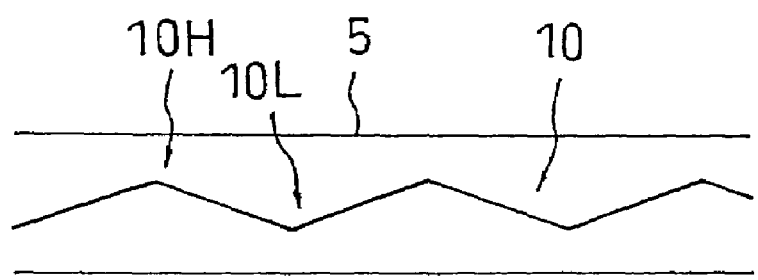
(b)
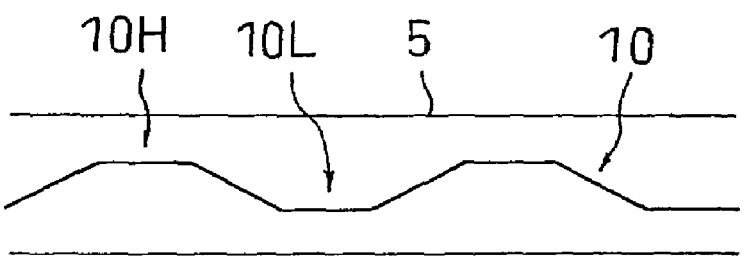
(c)
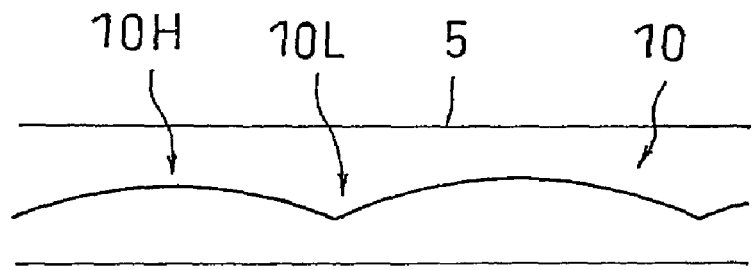

[FIG.8]
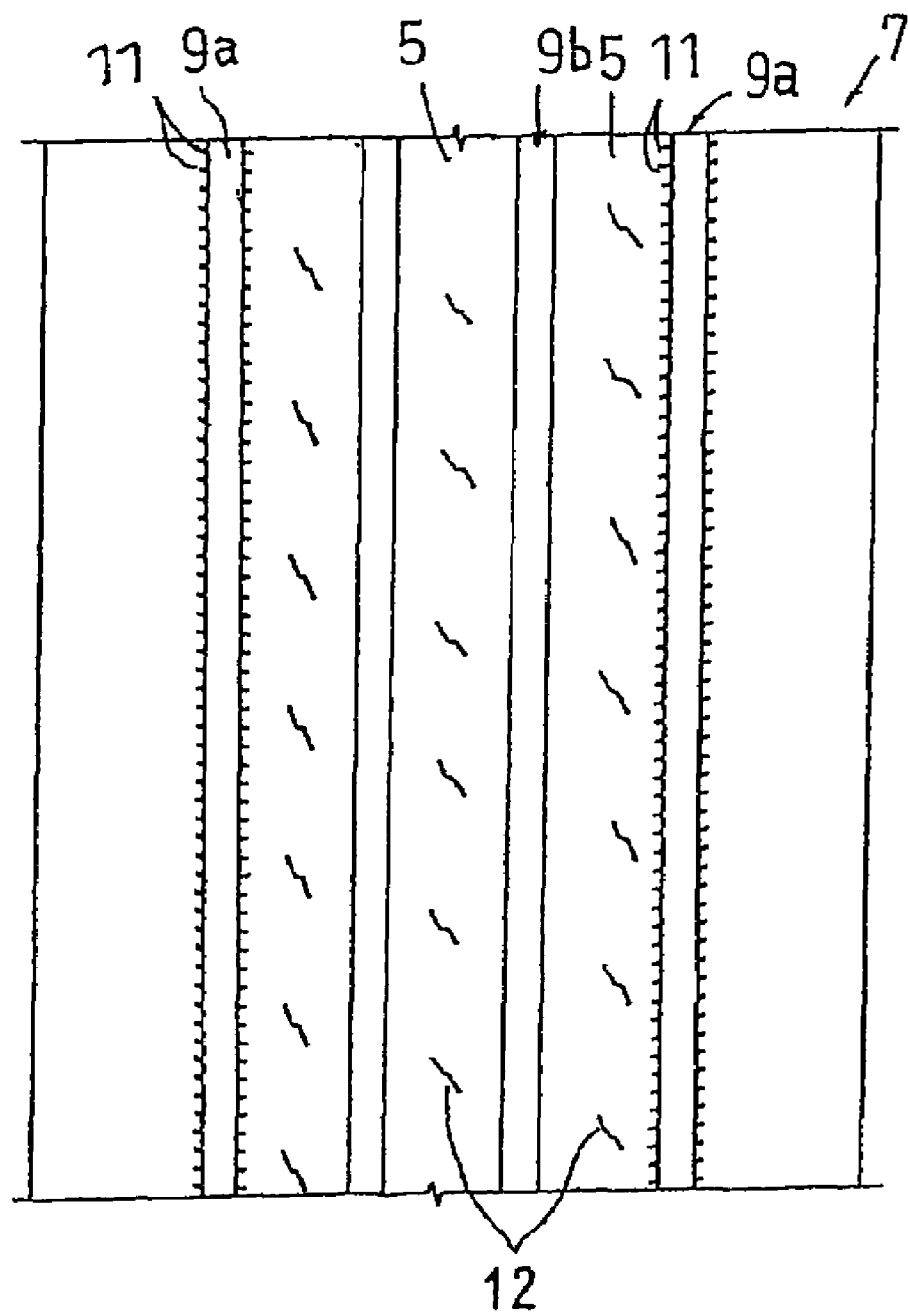
Background Art

HEAVY LOAD PNEUMATIC TIRE WITH TREAD HAVING CLOSED SIPEINGS IN RIBS AND PROJECTING STRIPE IN MAIN GROOVE

BACKGROUND OF THE INVENTION

1. Field of the Invention

This invention relates to a heavy load pneumatic tire in which a tread portion has a rib pattern formed with ribs divided by main grooves which are continuous in a tire circumferential direction.

2. Description of the Related Art

Conventionally, as a tread pattern formed on a tread portion of a heavy load pneumatic tire, there is a known rib pattern formed with ribs divided by a main groove which is continuous in a tire circumferential direction. The heavy load pneumatic tire provided with the rib pattern is superior to a tire having a block pattern in wear resistance, but has a problem that only an edge of the rib is locally unevenly worn in the circumferential direction, i.e., a river wear is prone to be generated.

Concerning details of generation process of this river wear, it is considered that a fine step is first generated in a rib end by a lateral force caused during running of the tire, a drag is generated by a diameter difference at this step portion and this step spreads in a widthwise direction of the tire, and the irregular wear is developed. Thus, in order to suppress the river wear, it is extremely important to prevent the local wear of the rib edge.

As means for suppressing such a fine step of the rib edge, as shown in FIG. 8, generally, fine sipeings 11 are formed in a widthwise direction of an edge of a rib 5 to reduce the rigidity, thereby suppressing local wear (see Japanese Patent Application Laid-open No. 2004-1608, for example). One end of the sipeing 11 is opened toward a groove, and the other end is closed within the rib.

However, in order to effectively lower the rigidity by the sipeings, it is necessary to elongate the sipeing, there is an adverse effect that a crack is generated in the sipeing end by input from a road surface, and there is a problem that the irregular wear resistance is deteriorated, the appearance is deteriorated and the like.

On the other hand, there is a known tire in which a bottom surface of a main groove of a tire tread portion is provided with a projecting stripe, but this tire can not effectively prevent the river wear from generating due to the following reasons. For example, Japanese Patent Application Laid-open No. 2001-163014 discloses a tire in which a bottom surface of a main groove is provided with a projecting stripe whose height is 0.1 to 0.3 of the groove depth and whose width is 0.5 to 1.0 of the groove bottom width. Since the height of the projecting stripe is low and the width thereof is too wide, it is difficult to prevent the river wear generation while preventing the crack in the grove bottom or stone-biting. Japanese Patent Application Laid-open No. H9-66708 discloses a tire in which a bottom surface of a main groove is provided with a projecting stripe whose height is 0.15 to 0.25 of the groove depth and whose width is 0.20 to 0.35 of the groove bottom width. However, since the groove provided with the projecting stripe is a wide main groove having the groove width greater than the groove depth, the rigidity enhancing effect obtained by providing the projecting stripe becomes low, and it is difficult to effectively prevent the river wear generation.

In order to prevent the stone-biting toward the groove in the circumferential direction, there is a known tire in which a bottom surface of a groove of the tire tread portion in the circumferential direction is provided with a corrugated projecting stripe whose height is varied cyclically (see Japanese Patent Application Laid-open No. H6-239107, for example). However, since the groove bottom is provided with a simply corrugated projecting stripe, there is a problem that the river wear can not effectively be prevented.

SUMMARY OF THE INVENTION

It is an object of the present invention to provide a heavy load pneumatic tire capable of effectively preventing a river wear generation while preventing a crack or a stone-biting generation in a sipeing end.

The above object can be achieved by the present invention as follows:

That is, the present invention provides a heavy load pneumatic tire in which a tread portion has a rib pattern formed with ribs divided by main grooves which are continuous in a circumferential direction of the tire, wherein at least one of the main grooves that is located on the outermost side in a widthwise direction of the tire is provided at its groove bottom with a projecting stripe which is continuous in the circumferential direction of the tire, and the ribs adjacent to an inner side of the main groove are provided with closed sipeings arranged at substantially constant distances from each other. In this invention, the closed sipeing is a sipeing whose opposite ends are not opened into the groove.

According to the present invention, since the above-described projecting stripe is provided, the shape deformation of the cross section of the groove caused by the compression deformation of the rib can be reduced, and a slip of the rib edge caused by the shape deformation can also be reduced. Therefore, the local wear of the rib edge can be reduced, and the river wear can be suppressed. At that time, the deformation of the rib by compression is absorbed by the closed sipeing provided on the rib which is adjacent to the inside thereof, and the slip of the rib edge is further reduced. Further, the stone-biting can be prevented by the projecting stripe provided on the groove bottom, and since the sipeing is closed, a crack is less prone to be generated in the sipeing end. As a result, it is possible to provide a heavy load pneumatic tire capable of effectively preventing a river wear generation while preventing a crack from generating in a sipeing end or a stone-biting.

In the above heavy load pneumatic tire, it is preferable that a height of the projecting stripe is varied cyclically along the circumferential direction of the tire, and a high portion of the projecting stripe is disposed adjacent to a position where there is no closed sipeing. The suppressing effect of the motion of the rib edge is different between the portion having the closed sipeing and the portion having no closed sipeing, and the higher the projecting stripe, the greater the suppressing effect of the slip of the rib edge. Therefore, if the high portion of the projecting stripe is disposed in the portion having no closed sipeing, the suppressing effect of the motion of the rib edge can be equalized in the tire circumferential direction, and the generation of the river wear can be suppressed uniformly.

It is preferable that a height of the projecting stripe is varied in a corrugated form along the circumferential direction of the tire, and a magnitude of amplitude thereof is 20% or less of a depth of the main groove. If the magnitude of the amplitude is 20% or less, the effect obtained by providing the closed sipeing and the effect obtained by variation of the height of the projecting stripe are well balanced, and the generation of the river wear can be suppressed more uniformly.

It is preferable that a height H of the projecting stripe and a depth D of the main groove have a relation of 0.2 D<H<0.5 D, and a width T of a bottom of the projecting stripe and a width W of the groove bottom of the main groove have a relation of 0.2 W<T<0.6 W. With the relation of 0.2 D<H<0.5 D, while the stone-biting can be prevented, the shape deformation of the groove cross section can sufficiently be reduced, and the drain performance can be kept to some extent. With the relation of 0.2 W<T<0.6 W, while a crack is prevented from being formed in the groove bottom and the shape deformation of the groove cross section can sufficiently be reduced.

It is preferable that the projecting stripe has a cross section shape whose width is gradually reduced from a groove bottom of the main groove toward an upper surface of the main groove. In this case, since the projecting stripe has such a cross section shape, the stone-biting can be prevented more reliably.

BRIEF DESCRIPTION OF THE DRAWINGS

FIG. 1 is a sectional view of a half meridian of one example of a heavy load pneumatic tire of the present invention;

FIG. 2 is a developed view showing one example of a tread portion of the heavy load pneumatic tire of the invention;

FIG. 3 is a sectional view of an essential portion of one example of the heavy load pneumatic tire of the invention;

FIG. 4 are explanatory views of an essential portion for explaining the effect of the invention;

FIG. 5 is a partially cutaway perspective view of a preferable example of the heavy load pneumatic tire of the invention;

FIG. 6 are plan views of an essential portion of another example of a closed sipeing of the invention;

FIG. 7 are side views of an essential portion showing another example of a projecting stripe of the invention; and FIG. 8 is a developed view of one example of a tread portion of a conventional heavy load pneumatic tire.

DESCRIPTION OF THE PREFERRED EMBODIMENTS

Embodiments of the present invention will be explained with reference to the drawings below. FIG. 1 is a sectional view of a half meridian of one example of a heavy load pneumatic tire of the present invention, and FIG. 2 is a developed view of a tread portion of the tire.

As shown in FIGS. 1 and 2, the heavy load pneumatic tire of the present invention has a tread portion provided with a rib pattern formed with ribs 5. The ribs 5 are divided by main grooves 9 which are continuous in a circumferential direction of the tire. Main grooves 9a of the main grooves 9 are located on the outermost opposite sides of a widthwise direction of the tire. At least a groove bottom of each of the main grooves 9a is provided with a projecting stripe 10 which is continuous in the tire circumferential direction.

In this invention, as shown in FIG. 3, if the height of the projecting stripe 10 is defined as H and the depth of the main groove 9a is defined as D, it is preferable that a relation 0.2 D<H<0.5 D is established therebetween, and it is more preferable that a relation 0.3 D<H<0.4 D is established. If the height H is 0.2 D or less, the shape deformation of the cross section of the groove caused by the compression of the rib can not be reduced sufficiently. If the height H becomes 0.5 D or greater, the problem of stone-biting during running is prone to be generated.

As shown in FIG. 3, if the width of the bottom of the projecting stripe 10 is defined as T and the groove bottom width of the main groove 9a is defined as W, it is preferable that a relation 0.2 W<T<0.6 W is established therebetween, and it is more preferable that a relation 0.3 W<T<0.5 W is established. If the width T of the bottom of the projecting stripe 10 becomes 0.2 W or less, the shape deformation of the cross section of the groove caused by the compression of the rib can not be reduced sufficiently. If the width T becomes 0.6 W or greater, it becomes difficult to prevent a crack generation in the groove bottom of the main groove 9a.

The invention will be explained in more detail. When a heavy load is applied to the heavy load pneumatic tire, if there is no projecting stripe 10 as shown in FIG. 4(a), a rib edge 5a of the rib 5 largely juts toward the main groove 9a. On the other hand, when there is the projecting stripe 10 as shown in FIG. 4(b), the rib edge 5a of the rib 5 does not jut toward the main groove 9a almost at all. Therefore, if the projecting stripe 10 is provided, the shape deformation of the cross section of the groove caused by the compression of the rib 5 can be reduced, and a slip of the rib edge 5a caused by the shape deformation can also be reduced. Therefore, the local wear of the rib edge 5a can be reduced, and the river wear can be suppressed.

The cross section shape of the rib 5 is not limited if the above size relation is satisfied. Examples of the cross section shape are trapezoidal shape, square shape, rectangular shape, semi-circular shape, semi-elliptic shape, triangular shape, polygonal shape and the like. It is preferable that the projecting stripe 10 has a cross section shape whose width is gradually reduced from the groove bottom of the main groove 9a toward an upper surface 10a of the projecting stripe 10. More concretely, it is preferable that the width t of the upper surface 10a is 0.8 T to 0.9 T with respect to the width T of the bottom of the projecting stripe 10.

In the general heavy load pneumatic tire, the groove bottom width W of the main groove 9a is preferably in a range of 2 to 16 mm, and more preferably in a range of 4 to 12 mm. The depth D of the main groove 9a is preferably in a range of 10 to 20 mm, and more preferably in a range of 14 to 16 mm. An inclination angle of a side wall of the main groove 9a is preferably in a range of 0 to 20°, and a boundary between the side wall and the groove bottom is an curved surface.

The tread pattern shown in FIG. 2 is further provided with a central main groove 9b. The central rib 5 and both the ribs 5 on the opposite sides are respectively provided with sipeings 12b and 12a for enhancing the wet performance.

In this invention, the rib 5 which is adjacent to the inner side of the main groove 9a provided with the projecting stripe 10 is provided with closed sipeings 12a which are disposed at distances from one another. The distance between the closed sipeings 12a is preferably in a range of 30 to 40 mm in view of uniformity of ground-contact pressure and balance of rib rigidity reduction. The groove width of the closed sipeing 12a is preferably in a range of 0.5 to 1.0 mm and more preferably in a range of 0.6 to 0.7 mm for absorbing deformation when the rib 5 is compressed and deformed and for preventing the rib 5 from spreading.

It is preferable that a distance between one end of the closed sipeing 12a and the rib edge 5a is in a range of 7 to 15 mm. If this distance becomes excessively short, the rib rigidity is deteriorated, and the wear is promoted.

The closed sipeing 12a is for absorbing the deformation when the rib 5 is compressed and deformed and for preventing the rib 5 from spreading. For this purpose, it is preferable that the closed sipeing 12a has an angle portion of 0 to 45° with respect to the tire circumferential direction PD.

In this invention, as shown in FIG. 5, it is preferable that the height of the projecting stripe 10 is cyclically changed along the tire circumferential direction PD and a high portion 10H of the projecting stripe 10 is disposed adjacent to a position where there is no closed sipeing 12a. It is preferable that a low portion 10L of the projecting stripe 10 is disposed adjacent to a position where the closed sipeing 12a exists.

It is preferable that the height of the projecting stripe 10 is varied in a corrugated form along the tire circumferential direction PD. It is preferable that the magnitude of the amplitude is 20% or less of the depth of the main groove 9a.

The heavy load pneumatic tire of this invention is the same as the conventional tire except the tread portion 7, and any conventional tire can be adopted. For example, one or more belt layers 8 are disposed on an outer side of a carcass ply 1 of the tire tread portion 7 like the conventional technique, a belt reinforcing layer is disposed if necessary, and the above-described tread pattern is formed on an outer peripheral surface of the tire of the tread rubber of the outer side. Usually, an inner liner is provided inside of the carcass ply 1, and a sidewall rubber is provided outside thereof.

The carcass ply 1 comprises one or more plies in which steel cords or high strength organic fiber cords are arranged in the radial direction of the tire. The carcass ply 1 is wound and retained around a bead core 3 comprising laminated layers of a bead wire and a coating rubber and around a rubber filler 4 disposed on the bead core 3 from inside to outside.

The rubber filler 4 has a cross section formed into substantially deformed triangular shape (bottom thereof is arc) extending in the radial direction of the tire. A winding-up end 1a of the carcass ply 1 is preferably located at an intermediate portion of a slant of the rubber filler 4. Further, a pad 6 is provided such as to sandwich the winding-up end 1a of the carcass ply 1 together with the rubber filler 4.

The heavy load pneumatic tire is used for a relatively heavy vehicle such as a truck or a bus.

Another Embodiment (1) In the previous embodiment, the main groove formed with the projecting stripe is straightly provided in the circumferential direction of the tire. This main groove may be in a zigzag form only if the main groove is continuous in the circumferential direction.

(2) The previous embodiment has the rib pattern in which all of the lands provided on the tread portion are formed of ribs. In this invention, however, the tread pattern may be partially provided with a block only if it has a rib which is continuous in the circumferential direction of the tire.

(3) In the previous embodiment, only the main groove located on the outermost side in the widthwise direction of the tire is formed with the projecting stripe, but according to the invention, all of the main grooves which are continuous in the circumferential direction of the tire may be provided with the projecting stripes.

(4) In the previous embodiment, the closed sipeing has the portion which is inclined at an angle of about 30° with respect to the circumferential direction of the tire, and this inclined portion is provided at the intermediate portion of opposite edge of the rib which is in parallel to the circumferential direction of the tire. Alternatively, closed sipeings having various shapes as shown in FIGS. 6(a) to 6(c) can be adopted.

FIG. 6(a) shows a straight closed sipeing, and the inclination angle is preferably 0 to 45° with respect to the tire circumferential direction PD. FIG. 6(b) shows a curved closed sipeing, and the inclination angles of its opposite ends are smaller than that of the central portion. FIG. 6(c) shows a closed sipeing comprising several straight lines, and the inclination angles of the opposite ends thereof are smaller than that of the central portion.

(5) In the previous embodiment, the height of the projecting stripe is varied in the corrugated form along the circumferential direction of the tire. Alternatively, projecting stripes 10 having various shapes as shown in FIGS. 7(a) to 7(c) can be adopted.

FIG. 7(a) shows a projecting stripe 10 whose height is varied in the zigzag form along the tire circumferential direction PD. FIG. 7(b) shows the projecting stripe 10 having the high portion 10H and the low portion 10L having constant heights. FIG. 7(c) shows a projecting stripe 10 comprising a plurality of arc apexes, the high portion 10H has an arc apex and the low portion 10L comprises a boundary of the arcs.

EXAMPLE OF THE PRESENT INVENTION

Examples of the present invention which concretely show the structure and effect of the present invention will be explained below. The evaluation items of the examples of the present invention and the like were measured in the following manner.

(1) Irregular Wear Resistance

Test tires were mounted on front wheels of a long-distance truck, the truck was allowed to run on a dry road surface through 80,000 km and then, the irregular wear volume was measured, and its reciprocal was expressed as indices (the higher the value, the more excellent the resistance is).

(2) Sipeing Crack Performance

After the test (1) was completed, presence or absence of the sipeing crack was visually checked.

(3) Crack Performance of Groove Bottom

After the test (1) was completed, presence or absence of the crack in the groove bottom was visually checked.

(4) Stone-Biting Performance

After the test (1) was completed, presence or absence of the stone-biting in the groove was visually checked.

(5) Drainage

Test tires were mounted on front wheels of a long-distance truck, the truck was allowed to run on a wet road surface, a braking distance when a brake pedal was fully stepped from 60 km/h was measured, and its reciprocal was expressed as indices (the higher the value, the more excellent the drainage is).

Conventional Example 1 (Rib Pattern having No Sipeing)

In the rib pattern shown in FIG. 2, normal heavy load pneumatic tires (size: 295/75R22.5) having the same tread pattern except that a projecting stripe was not formed were prepared, and the above evaluation was carried out. The depth D of the main groove is 15 mm, the groove bottom width W of the main groove is 9 mm (these values are the same in the subsequent tests). The groove width of the closed sipeing is 0.6 mm, the length thereof is 10 mm, and the interval pitch is 35 mm, a distance to the rib edge is 9.5 mm, the inclination angle with respect to the circumferential direction is about 30° (these values are the same in the subsequent tests).

Conventional Example 2 (Rib Pattern having Sipeing)

In the rib pattern shown in FIG. 8, normal heavy load pneumatic tires (size: 295/75R22.5) of a tread pattern (groove length of sipeing provided in the rib edge is 4 mm, the groove depth is 15 mm, the groove pitch is 4 mm) were prepared, and the above-described evaluation was carried out.

Example of the Present Invention 1

In the rib pattern shown in FIG. 2, normal heavy load pneumatic tires (size: 295/75R22.5) in which size of the projecting stripe was set to a value shown in Table 1 were prepared, and the above-described evaluation was carried out. Table 1 shows a result thereof. The sipeing provided on the rib edge of the central rib is the same as that of the conventional example 2 (the conventional example 1, other examples of the present invention, reference examples and comparative examples have the same sipeings).

TABLE 1

|  | Conventional example | | Example of the present invention |
|---|---|---|---|
|  | 1 | 2 | 1 |
| T/W | — | — | 0.4 |
| H/D | — | — | 0.4 |

TABLE 1-continued

|  | Conventional example | | Example of the present invention |
|---|---|---|---|
|  | 1 | 2 | 1 |
| t/T | — | — | 0.9 |
| Irregular Wear resistance | 100 | 109 | 117 |
| Sipeing crack | Absence | Presence | Absence |

Examples of the Present Invention 2 and 3

In the rib pattern shown in FIG. 2, normal heavy load pneumatic tires (size: 295/75R22.5) in which the size of the projecting stripe was set to a value shown in Table 2 were prepared, and the above evaluation was carried out. Table 2 shows a result of the evaluation.

Reference Examples 1 and 2

In the rib pattern shown in FIG. 2, normal heavy load pneumatic tires (size: 295/75R22.5) in which the size of the projecting stripe was set to a value shown in Table 2 were prepared, and the above evaluation was carried out. Table 2 shows a result of the evaluation.

TABLE 2

|  | Conventional example | | Reference example | Example of the present invention | | | Reference example |
|---|---|---|---|---|---|---|---|
|  | 1 | 2 | 1 | 2 | 1 | 3 | 2 |
| T/W | — | — | 0.2 | 0.3 | 0.4 | 0.5 | 0.6 |
| H/D | — | — | 0.4 | 0.4 | 0.4 | 0.4 | 0.4 |
| t/T | — | — | 0.9 | 0.9 | 0.9 | 0.9 | 0.9 |
| Irregular Wear resistance | 100 | 109 | 108 | 113 | 117 | 121 | 124 |
| Crack in the groove bottom | Absence | Absence | Absence | Presence | Absence | Absence | Presence |

Example 4 of the Present Invention

In the rib pattern shown in FIG. 2, normal heavy load pneumatic tires (size: 295/75R22.5) in which the size of the projecting stripe was set to a value shown in Table 3 were prepared, and the above evaluation was carried out. Table 3 shows a result of the evaluation.

Reference Examples 3 and 4

In the rib pattern shown in FIG. 2, normal heavy load pneumatic tires (size: 295/75R22.5) in which the size of the projecting stripe was set to a value shown in Table 3 were prepared, and the above evaluation was carried out. Table 3 shows a result of the evaluation.

TABLE 3

|  | Conventional example | | Reference example | Example of the present invention | | Reference example |
| --- | --- | --- | --- | --- | --- | --- |
|  | 1 | 2 | 3 | 4 | 1 | 4 |
| T/W | — | — | 0.4 | 0.4 | 0.4 | 0.4 |
| H/D | — | — | 0.2 | 0.3 | 0.4 | 0.6 |
| t/T | — | — | 0.9 | 0.9 | 0.9 | 0.9 |
| Irregular Wear resistance | 100 | 109 | 106 | 114 | 117 | 117 |
| Stone-biting | Absence | Absence | Absence | Absence | Absence | Presence |
| Drainage | 100 | 100 | 99 | 98 | 97 | 94 |

Examples 5 and 6 of the Present Invention

In the rib pattern shown in FIG. 2, normal heavy load pneumatic tires (size: 295/75R22.5) in which the size of the projecting stripe was set to a value shown in Table 4 were prepared, and the above evaluation was carried out. Table 4 shows a result of the evaluation.

Reference Example 5

In the rib pattern shown in FIG. 2, normal heavy load pneumatic tires (size: 295/75R22.5) in which the size of the projecting stripe was set to a value shown in Table 4 were prepared, and the above evaluation was carried out. Table 4 shows a result of the evaluation.

TABLE 4

|  | Conventional example | | Example of the present invention | | Reference example |
| --- | --- | --- | --- | --- | --- |
|  | 1 | 2 | 5 | 6 | 5 |
| T/W | — | — | 0.4 | 0.4 | 0.4 |
| H/D | — | — | 0.4 | 0.4 | 0.4 |
| t/T | — | — | 0.8 | 0.9 | 1.0 |
| Irregular Wear resistance | 100 | 109 | 117 | 117 | 117 |
| Stone-biting | Absence | Absence | Absence | Absence | Presence |

As is apparent from the above results, according to the present invention, especially when the height H of the projecting stripe and the depth D of the main groove have the relation of 0.2 D<H<0.5 D and the width T of the bottom of the projecting stripe and the width W of the groove bottom of the main groove have the relation of 0.2 W<T<0.6 W, a crack of the groove bottom and a stone-biting can be prevented and the generation of river wear can effectively prevented.

Example 7 of the Present Invention

In the rib pattern shown in FIG. 2, normal heavy load pneumatic tires (size: 295/75R22.5) in which size of the projecting stripe was set to a value (T/W=0.4, t/T=0.9) shown in Table 5 were prepared, and the above-described evaluation was carried out. Table 5 shows a result thereof together with results of the conventional examples 1 and 2.

Example 8 of the Present Invention

In the rib pattern shown in FIG. 2, normal heavy load pneumatic tires (size: 295/75R22.5) in which size of the projecting stripe was set to a value (T/W=0.4, t/T=0.9) shown in Table 5 were prepared. In the heavy load pneumatic tire, the height of the projecting stripe 10 is varied in the corrugated form in the tire circumferential direction PD as shown in FIG. 5, and the magnitude of the amplitude thereof is 10% or less of the depth of the main groove. Then, the above-described evaluation was carried out. Table 5 shows a result thereof together with results of the conventional examples 1 and 2.

Reference Example 6

In the example 8 of the present invention, normal heavy load pneumatic tires (size: 295/75R22.5) whose projecting stripe had opposite phase were prepared, and the above evaluation was carried out. Table 5 shows a result thereof together with results of the conventional examples 1 and 2.

TABLE 5

|  | Conventional example | | Example of the present invention | | Reference example |
| --- | --- | --- | --- | --- | --- |
|  | 1 | 2 | 7 | 8 | 6 |
| H/D of projecting stripe | — | — | 50% | 50% | 50% |
| Phase | — | — | — | Normal | Opposite |
| Magnitude of heights of projecting stripe | — | — | — | 10% | 10% |
| Irregular Wear resistance | 100 | 109 | 117 | 125 | 106 |

In Table 5, "Normal" in phase shows a case in which a high portion of the projecting stripe is disposed adjacent to a position where there is no closed sipeing, and "Opposite" shows a case in which a low portion of the projecting stripe is disposed adjacent to a position where there is no closed sipeing (the same is applied to Table 6).

Examples 9 to 11 of the Present Invention

In the rib pattern shown in FIG. 2, normal heavy load pneumatic tires (size: 295/75R22.5) in which size of the projecting stripe was set to a value (T/W=0.4, t/T=0.9) shown in Table 5 were prepared. In the heavy load pneumatic tire, the height of the projecting stripe 10 is varied in the corrugated form in the tire circumferential direction PD as shown in FIG. 5, and the magnitude of the amplitude thereof is 5 to 20% of the depth of the main groove. Then, the above-described evaluation was carried out. Table 6 shows a result thereof together with results of the conventional examples 1 and 2 and of the example 8 of the present invention.

Reference Example 7

In the example 9 of the present invention, normal heavy load pneumatic tires (size: 295/75R22.5) in which the magnitude of the amplitude was set to 25% of the depth of the main groove were prepared, and the above evaluation was carried out. Table 6 shows a result thereof together with results of the conventional examples 1 and 2 and of the example 8 of the present invention.

TABLE 6

|  | Conventional example | | Example of the present invention | | | | Reference example |
| --- | --- | --- | --- | --- | --- | --- | --- |
|  | 1 | 2 | 9 | 8 | 10 | 11 | 7 |
| H/D of projecting stripe | — | — | 50% | 50% | 50% | 50% | 50% |
| Phase | — | — | Normal | Normal | Normal | Normal | Normal |
| Magnitude of heights of projecting stripe | — | — | 5% | 10% | 15% | 20% | 25% |
| Irregular Wear resistance | 100 | 109 | 121 | 125 | 121 | 117 | 106 |

As is apparent from the above result, if the high portion of the projecting stripe is disposed at a portion where there is no closed sipeing, the suppressing effect of the slip of the rib edge by the compression can be equalized in the tire circumferential direction, and the generation of river wear can be suppressed more equally. If the magnitude of the amplitude is 20% or less, the effect obtained by providing the closed sipeing and the effect obtained by variation of the height of the projecting stripe are well balanced, and the wear resistance is further enhanced.

What is claimed is:

1. A heavy load pneumatic tire in which a tread portion has a rib pattern formed with ribs divided by main grooves which are continuous in a circumferential direction of the tire, wherein at least one of the main grooves that is located on the outermost side in a widthwise direction of the tire is provided at its groove bottom with a projecting stripe which is continuous in the circumferential direction of the tire, and the ribs adjacent to an inner side of the main groove are provided with closed sipeings arranged at substantially constant distances from each other, wherein the projecting stripe is comprised of a high-height portion and a low-height portion arranged alternately and repeatedly along the circumferential direction of the tire, wherein the high-height portions are cyclically disposed at positions where there are no closed sipeings as viewed from the side of the tire, and the low-height portions are cyclically disposed at positions where the closed sipeings are located as viewed from the side of the tire.

2. The heavy load pneumatic tire according to claim 1, wherein a height of the projecting stripe is varied in a corrugated form along the circumferential direction of the tire, and a magnitude of amplitude thereof is 20% or less of a depth of the main groove.

3. The heavy load pneumatic tire according to claim 1, wherein a height H of the projecting stripe and a depth D of the main groove have a relation of 0.2 D<H<0.5 D, and a width T of a bottom of the projecting stripe and a width W of the groove bottom of the main groove have a relation of 0.2 W>T<0.6 W.

4. The heavy load pneumatic tire according to claim 1, wherein the projecting stripe has a cross section shape whose width is gradually reduced from a groove bottom of the main groove toward an upper surface of the main groove.

5. The heavy load pneumatic tire according to claim 1, wherein the closed sipeings are arranged substantially in the same direction.

6. The heavy load pneumatic tire according to claim 1, wherein the main grooves on the outermost side are the only grooves that have the projecting stripe.

7. A heavy load pneumatic tire having a tread portion comprising:

main grooves substantially parallel to each other, each being formed continuously in a circumferential direction of the tire, said main grooves being comprised of outer main grooves and inner main groove(s);

a projecting stripe formed continuously in at least one of the outer main grooves at its groove bottom in the circumferential direction of the tire, said projecting stripe having a height shorter than a depth of the outer main groove; and ribs divided by the main grooves, two of which are inwardly adjacent to the respective outer main grooves and have closed sipeings arranged thereon at substantially constant intervals from each other in the circumferential direction of the tire, wherein the projecting stripe is comprised of a high-height portion and a low-height portion arranged alternately and repeatedly along the circumferential direction of the tire, wherein the high-height portions are cyclically disposed at positions where there are no closed sipeings as viewed from the side of the tire, and the low-height portions are cyclically disposed at positions where the closed sipeings are located as viewed from the side of the tire.

8. The heavy load pneumatic tire according to claim 7, wherein each of the outer main grooves is provided with the projecting stripe.

9. The heavy load pneumatic tire according to claim 7, wherein the projecting stripe has a height which varies in a corrugated form along the circumferential direction of the tire, wherein the corrugated form has a magnitude of amplitude which is 20% or less of a depth of the main groove.

10. The heavy load pneumatic tire according to claim 7, wherein a height H of the projecting stripe and a depth D of the main groove have a relation of 0.2 D<H<0.5 D, and a width T of a bottom of the projecting stripe and a width W of the groove bottom of the main groove have a relation of 0.2 W<T<0.6 W.

11. The heavy load pneumatic tire according to claim 7, wherein the projecting stripe has a width continuously decreasing toward an upper surface of the projecting stripe.

12. The heavy load pneumatic tire according to claim 7, wherein the closed sipeings are arranged substantially in the same direction.

13. The heavy load pneumatic tire according to claim 7, wherein the outer main grooves are the only grooves that have the projecting stripe.

\* \* \* \* \*